(12) United States Patent
McMillen et al.

(10) Patent No.: US 8,219,508 B2
(45) Date of Patent: Jul. 10, 2012

(54) SYSTEMS AND METHODS FOR COMPRESSING STATE MACHINE INSTRUCTIONS USING A TWO ACCESS INDEXING SCHEME

(75) Inventors: Robert James McMillen, Carlsbad, CA (US); Michael D. Ruehle, Albuquerque, NM (US)

(73) Assignee: LSI Corporation, Milpitas, CA (US)

( * ) Notice: Subject to any disclaimer, the term of this patent is extended or adjusted under 35 U.S.C. 154(b) by 1042 days.

(21) Appl. No.: 12/167,165

(22) Filed: Jul. 2, 2008

(65) Prior Publication Data

US 2009/0063825 A1 Mar. 5, 2009

Related U.S. Application Data

(60) Provisional application No. 60/948,402, filed on Jul. 6, 2007.

(51) Int. Cl.
*G06F 15/18* (2006.01)
(52) U.S. Cl. .......................................... 706/12

(58) Field of Classification Search ............... 706/12, 706/45, 52; 345/156; 715/866; 707/705; 382/155–161; 726/22–24
See application file for complete search history.

(56) References Cited

U.S. PATENT DOCUMENTS

| 6,018,776 A * | 1/2000 | Wise et al. .................. 710/7 |
| 2003/0065800 A1 * | 4/2003 | Wyschogrod et al. ........ 709/230 |
| 2010/0174770 A1 * | 7/2010 | Pandya ....................... 709/200 |

OTHER PUBLICATIONS

Norton, Optimizing Pattern MAtching for Intrusion Detection, 2004, idsresearch.org, pp. 1-11.*
Endre Tarjan et al., Storing a Sparse Table, 1979, ACM, pp. 606611.*

* cited by examiner

*Primary Examiner* — David Vincent

(57) ABSTRACT

Systems and methods for compressing state machine instructions are disclosed herein. In one embodiment, the method comprises associating input characters associated with states to respective indices, where each index comprises information indicative of a particular transition instruction.

28 Claims, 11 Drawing Sheets

| Base Address | N-1 | ... | 1 0 |
|---|---|---|---|
| A | Transition Instruction for Class 0 | | |
| A + 1 | Transition Instruction for Class 1 | | |
| A + 2 | Transition Instruction for Class 2 | | |
| ⋮ | | | |
| A + C - 1 | Transition Instruction for Class C - 1 | | |

*FIG. 3*

| Base Address | N-1 | IB-1 | (I-1)B | 2B 2B-1 | B B-1 | 1 0 | |
|---|---|---|---|---|---|---|---|
| A | | UTI I - 1 | ... | UTI 1 | UTI 0 | | |
| A + 1 | | UTI 2I - 1 | ... | UTI I + 1 | UTI I | | Index Block |
| A + 2 | | UTI 3I - 1 | ... | UTI 2I + 1 | UTI 2I | | |
| ⋮ | | | | | | | |
| A + W - 1 | | UTI (W - 1) I - 1 | ... | UTI (W - 1) I + 1 | UTI (W - 1) I | | |
| A + W | Unique Transition Instruction 0 | | | | | | |
| A + W + 1 | Unique Transition Instruction 1 | | | | | | Unique Transition Block |
| A + W + 2 | Unique Transition Instruction 2 | | | | | | |
| ⋮ | | | | | | | |
| A + W + T - 1 | Unique Transition Instruction T - 1 | | | | | | |

*FIG. 4*

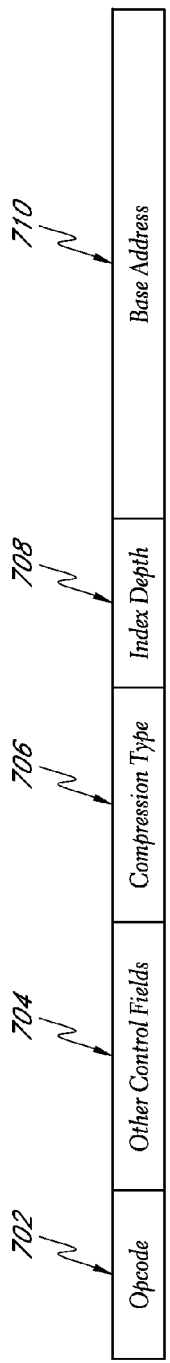

FIG. 9

| Index | 63 61 59 57 55 53 51 49 47 45 43 41 39 37 35 33 31 29 27 25 23 21 19 17 15 13 11 9 7 5 3 1 | | | | | | | | | | | | | |
|---|---|---|---|---|---|---|---|---|---|---|---|---|---|---|
| Offset | 62 60 58 56 54 52 50 48 46 44 42 40 38 36 34 32 30 28 26 24 22 20 18 16 14 12 10 8 6 4 2 0 | | | | | | | | | | | | | |
| 0 | ///// | 9 | 8 | 7 | 6 | 5 | 4 | 3 | 2 | 1 | 0 |
| 1 | ///// | 19 | 18 | 17 | 16 | 15 | 14 | 13 | 12 | 11 | 10 |
| 2 | ///// | 29 | 28 | 27 | 26 | 25 | 24 | 23 | 22 | 21 | 20 |
| 3 | ///// | 39 | 38 | 37 | 36 | 35 | 34 | 33 | 32 | 31 | 30 |
| 4 | ///// | 49 | 48 | 47 | 46 | 45 | 44 | 43 | 42 | 41 | 40 |
| 5 | ///// | 59 | 58 | 57 | 56 | 55 | 54 | 53 | 52 | 51 | 50 |
| 6 | ///// | 69 | 68 | 67 | 66 | 65 | 64 | 63 | 62 | 61 | 60 |
| 1 | ///// | 79 | 78 | 77 | 76 | 75 | 74 | 73 | 72 | 71 | 70 |
| 2 | ///// | 89 | 88 | 87 | 86 | 85 | 84 | 83 | 82 | 81 | 80 |
| 3 | ///// | 99 | 98 | 97 | 96 | 95 | 94 | 93 | 92 | 91 | 90 |
| 4 | ///// | 109 | 108 | 107 | 106 | 105 | 104 | 103 | 102 | 101 | 100 |
| 5 | ///// | 119 | 118 | 117 | 116 | 115 | 114 | 113 | 112 | 111 | 110 |
| 6 | ///// | ///// | 127 | 126 | 125 | 124 | 123 | 122 | 121 | 120 |

FIG. 10

| Type ID | Bits of Index | | |
|---|---|---|---|
| 0 | 1 | (64 bits numbered 63 down to 0) | |
| 1 | 2 | 31 30 29 28 27 26 25 24 23 22 21 20 19 18 17 16 15 14 13 12 11 10 9 8 7 6 5 4 3 2 1 0 | |
| 2 | 4 | 15 14 13 12 11 10 9 8 7 6 5 4 3 2 1 0 | |
| 3 | 8 | 7 6 5 4 3 2 1 0 | |

FIG. 11

| Index Size | Bits Needed | | |
|---|---|---|---|
| 4 | 3 | 15 14 13 12 11 10 9 8 7 6 5 4 3 2 1 0 | |
| 8 | 5 | 7 6 5 4 3 2 1 0 | |
| 8 | 6 | 7 6 5 4 3 2 1 0 | |
| 8 | 7 | 7 6 5 4 3 2 1 0 | |

FIG. 12

| Index Offset | 63 61 59 57 55 53 51 49 47 45 43 41 39 37 35 33 31 29 27 25 23 21 19 17 15 13 11 9 7 5 3 1<br>62 60 58 56 54 52 50 48 46 44 42 40 38 36 34 32 30 28 26 24 22 20 18 16 14 12 10 8 6 4 2 0 |
|---|---|
| 0 | 7 6 5 4 3 2 1 0 |
| 1 | 15 14 13 12 11 10 9 8 |
| 2 | 23 22 21 20 19 18 17 16 |
| 3 | 31 30 29 28 27 26 25 24 |
| 4 | 39 38 37 36 35 34 33 32 |
| 5 | 47 46 45 44 43 42 41 40 |
| 6 | 55 54 53 52 51 50 49 48 |
| 7 | 63 62 61 60 59 58 57 56 |
| 8 | 71 70 69 68 67 66 65 64 |
| 9 | 79 78 77 76 75 74 73 72 |
| 10 | 87 86 85 84 83 82 81 80 |
| 11 | 95 94 93 92 91 90 89 88 |
| 12 | 103 102 101 100 99 98 97 96 |
| 13 | 111 110 109 108 107 106 105 104 |
| 14 | 119 118 117 116 115 114 113 112 |
| 15 | 127 126 125 124 123 122 121 120 |

FIG. 13

| n-1 | p+c+t-1 | p+c  p+c-1 |       | cc-1 |
|-----|---------|------------|-------|------|
| 1   | Compression Type |   | Block Index | 0 ... 00 |

FIG. 14

| 1 | CCL[8:] | Array ID | Array Index [23:10] | Hash[9:0] |

SYSTEMS AND METHODS FOR COMPRESSING STATE MACHINE INSTRUCTIONS USING A TWO ACCESS INDEXING SCHEME

CROSS-REFERENCE TO RELATED APPLICATIONS

This application claims the benefit under 35 U.S.C. 119(e) of U.S. Provisional Application No. 60/948,402, filed on Jul. 6, 2007, which is incorporated by reference in its entirety.

BACKGROUND OF THE INVENTION

1. Field of the Invention

The present invention relates to state machines, and in particular, to pattern matching applications that represent the patterns to be matched as one or more state machines.

2. Description of the Related Technology

In modern applications it is typical to have patterns that number in the thousands to as many as a million or more. For example, network security applications use large numbers of patterns to detect malicious content such as viruses, spam, and attempts to interfere with proper functioning of the network by gaining unauthorized access to resources and/or hampering performance. Recent advances in technology have made it feasible to do more than packet header inspection by using high-speed hardware that can look at all the bytes in a packet using a programmable state machine engine. Such a packet inspection engine may execute instructions that are, for example, created by a compiler that converts regular expressions into a deterministic finite automata (DFA), which is represented by the instructions.

Because high speed may be important, executable state machine instructions are stored in a manner that is conducive to fast access. This is generally at the expense of consuming more space. For example, 4,000 regular expressions that detect network intrusion can require 200 MB or more of storage when compiled for efficient execution. However, this is in opposition to the requirements of lower cost consumer products which may only have, for example, 50 MB or less available.

SUMMARY OF CERTAIN INVENTIVE ASPECTS

Depending on the embodiment, the systems and methods described herein may provide one or more of the following advantages:

1. An order of magnitude reduction in the total memory required to store a given state machine.
2. For low-cost computing platforms or otherwise memory-constrained platforms, applications may be deployed that were previously not possible
3. The architecture has been described in a parametric form making it broadly applicable for a wide range of configurations.
4. The implementation details allow for many variations enabling one practiced in the art to make tradeoffs between implementation complexity, cost, and ultimate compression ratio achieved.
5. The method may be suitable for direct-access and cache-based state machine execution engines.
6. In the case of cache-based engines, the double memory access required to fetch a compressed transition instruction only occur on a miss, so that when the hit rate is high, which is typical, there is no performance penalty. Decompression effectively occurs during the miss fetch.
7. An access method may eliminate an extra table look-up to perform virtual to physical address translation.
8. A Unique Translation Index (UTI) Word can optionally be kept in the cache to eliminate one cache miss memory access when UTIs near a previously accessed one are fetched.

In one embodiment, a computerized method of storing information associated with a state of a state machine comprises identifying a state comprising a plurality of transition instructions, each transition instruction associated with at least one input character and a next state, determining respective next states indicated by each of the plurality of transition instructions, associating each unique next state with a selected one of a plurality of indices that are each indicative of respective unique next states, wherein one or more of the input characters are associated with a first of the plurality of indices, storing the plurality of indices so that respective indices are associated with respective input characters, and storing each of the unique transition instructions so that each of the unique transition instructions are individually addressable in the memory and are accessible at respective locations indicated by the indices.

In one embodiment, a computerized method of traversing a state machine comprises determining a next character of an input data stream, accessing a first memory associated with a current state of the state machine to determine a transition index associated with the next character, accessing a second memory to determine a unique transition instruction associated with the determined transition index, wherein the unique transition instruction is indicative of a next state and each respective unique transition instruction uniquely identifies a next state for the current state, and selecting a next state indicated in the determined unique transition instruction.

In one embodiment, a computerized system for storing information associated with a state of a state machine comprises a compression module configured to analyze each of a plurality of transition instructions associated with a state to determine one or more unique transition instructions, wherein each transition instruction is associated with a respective character and a respective next state, and wherein each unique transition instruction is indicative of a different next state, and a memory configured to store the one or more unique transition instructions and respective instruction indices for each of the plurality of transition instructions, wherein each instruction index is indicative of one of the unique transition instructions.

In one embodiment, a state machine engine for accessing a compressed state transition block comprises a receiving module configured to access an input data stream to be analyzed, and an access module configured to access a memory a first time to determine a transition index associated with a next character of the data stream and to access the memory a second time to determine a transition instruction associated with the next character, wherein an address of the transition instruction is indicated by the determined transition index and the unique transition instruction is indicative of a next state.

BRIEF DESCRIPTION OF THE DRAWINGS

FIG. 3 is a diagram illustrating one embodiment of a general purpose state transition block as stored in a memory.

FIG. 4 is a diagram illustrating one embodiment of a compressed state transition block as stored in a memory.

FIG. 7 is a diagram illustrating one embodiment of an exemplary transition instruction for a compressed state.

FIG. 8 is a diagram showing a 64-bit memory slot having various values of bits per index.

FIG. 9 is a diagram showing one embodiment of an index block for a 64-bit memory slot, using 6 bits per index, and 128 unique transition instruction indices.

FIG. 10 is a diagram showing one embodiment of an index block wherein a 64-bit memory slot comprises various power-of-two values of bits per index.

FIG. 11 is a diagram showing one embodiment of unique transition instruction index locations used for various values of bits per index.

FIG. 12 is a diagram showing one embodiment of an index block for a 64-bit memory slot, using $2^3=8$ bits per index, and 128 unique transition instruction indices.

FIG. 13 is a diagram showing one embodiment of a base address field for interpretation as a virtual or physical address for a cache-based engine.

FIG. 14 is a diagram showing another embodiment of a base address field.

DETAILED DESCRIPTION

Figure 1A:
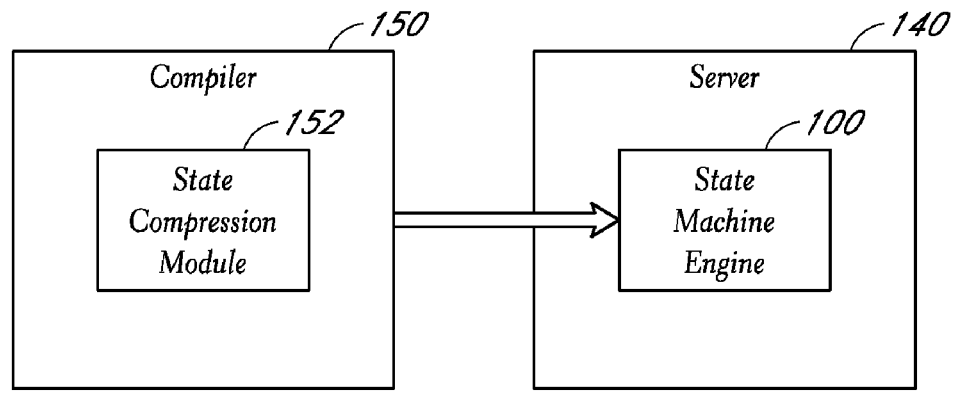
FIG. 1A is a block diagram illustrating one embodiment of a compiler configured to generate state machines having compressed state instructions for use in a state machine engine, such as in a network server that receives and transmits Internet data, for example.

The following detailed description is directed to certain specific sample aspects of the invention. However, the invention can be embodied in a multitude of different ways as defined and covered by the claims. In this description, reference is made to the drawings wherein like parts are designated with like numerals throughout.

The systems and methods described herein are directed towards compressing state machine instructions for storage in a memory. State machines are, generally, represented as a collection of states and the transitions between them. One general-purpose representation of a single state in a memory consists of a block of instructions in which there is one instruction per possible transition out of that state. Commonly owned U.S. patent application Ser. No. 11/422,312, filed Jun. 5, 2006, and titled "SYSTEMS AND METHODS FOR PROCESSING REGULAR EXPRESSIONS," which is hereby incorporated by reference in its entirety, describes various systems and methods for storing and processing regular expressions. In one embodiment, given the base address of a block of transition instructions for a state, the state transition instructions can be arranged so that the current transition character is added to the base address to compute the address of the next instruction to fetch. Thus, for 8-bit characters, 256 instructions per state are possible. In state machine parlance, the base address represents the present state and the present input represents a current transition character, such as a character in a data stream. In one embodiment, the instruction fetched contains the base address of the next state. By this process, an execution engine can evaluate state transitions that occur using an input character stream, using the state machine represented by the instructions in memory. Terminal states may be included to indicate when a match occurs, for example.

The following parameters can be used to characterize a general purpose state transition block (STB), which can be fetched by an execution engine in a single memory access cycle. Let N be the number of bits in a word of memory. Typical values for N may be 32 or 64; however, other implementations might use 36 or some other value. Let C be the maximum number of transitions that can exit a state. The value of C depends on implementation details. For 8-bit characters, if character classes are not in use, the value is at least 256, e.g., one transition per possible character value. In some implementations (see the above-incorporated disclosure "Systems and methods for processing regular expressions,"), an additional transition may be needed to support greedy matching in the case where this is a 'last accepting state.' In some implementations, another transition may be needed to support a special EOF (end-of-file) character. If both features are in use, then C=258. If character classes are in use, C could be a smaller number. C may also be a larger number to incorporate other special characters. Let A be the address in memory of the first instruction in the block. Then the block consists of the instructions in locations A through A+C−1. A is referred to as the base address of the block and it represents the state. If c is the present input (either a character or character class), then the instruction containing information about the next state the transition on c should go to is stored in location A+c, where $0 \leq c < C$. This is illustrated in FIG. 3, which is a diagram illustrating one embodiment of a general purpose state transition block as stored in a memory. By organizing the block this way, only a single memory access is needed to fetch the next state instruction, which contains the address of the STB of the next state. One drawback of this organization is that C instruction words are needed for every state in the machine.

State Machine Optimization

There are optimization techniques that can reduce memory consumption in various special cases. One method is to use character classes. In this case, the compiler determines which groups of characters, if any, always cause the same transitions and combines them into a single class. A look up table (e.g., a C-byte table) may then be created to translate each character into its assigned class. Blocks of state transition instructions then only require as many entries as there are classes. Addresses are then calculated by adding the character class number to the state instruction block base address. The efficiency of this technique depends on the patterns in use. The more individual characters are specified (versus character ranges or classes) among the patterns, the more classes are needed. Virus signatures are notorious for requiring a single character per class rendering this technique less effective. Also, the more patterns there are, the higher the probability more individual characters are explicitly used and the more classes are required.

For example, the regular expression "cat[0-9]+" consists of a three-character literal sequence followed by a single (explicit) character class that matches one or more digits. It can be represented using five character classes. The first class contains only the letter, 'a'; the second class, 'c'; the third class, 't'; the fourth class contains ten characters, '0', '1', '2', '3', '4', '5', '6', '7', '8', '9'; and the fifth class contains all possible characters except those in the first four classes. When multiple patterns are involved, the character usage across all of them is considered in determining which characters are assigned to which class. If a second pattern is added, defined as "[a-z]{2,8}tar7", eight classes are needed for the pair of expressions. Numbering them starting at 0, they are:

Class 0: 'a';
Class 1: 'c';
Class 2: 'r',
Class 3: 't';
Class 4: 'b', 'd' through 'q', 's', 'u' through 'z';
Class 5: '7';
Class 6: '0' through '6', '8', '9'; and
Class 7: all characters not in the previous 7 classes, which in character class notation is [^a-z0-9].

For a state that transitions on [a-z], there may be transitions on Classes 0, 1, 2, 3, and 4 that all go to the same next state, unless other states are involved in determining which expression the current character should be associated with. For example, from the start state, 't' could be the beginning of either of the two expressions, so Class 3 will transition to a different state than Classes 0, 1, 2, and 4. If subsequent characters do not match the first expression but do match the second, there may be transitions that lead back to states that complete the match for the second expression.

Another optimization is possible for states that transition on a single character or very few characters. The number of characters that can be supported may depend on the size of the instruction word. In such cases, a special instruction type can contain the character or characters of interest, so that the state's block of instructions only needs an instruction per character plus one for the failure case. One exploitation of such instruction types may be possible when all the patterns are literal strings, as with virus signatures, for example. This is because the state machine has a tree structure with the start state at the root. Near the root, states typically have a higher branching factor due to multiple literals that start with the same character sequence. For each path towards the leaves of the tree, eventually the branching factor becomes one. At that point in each literal, it is unique with respect to all other literals and the remaining transitions either match the next character in that literal or fail. For example, in a typical anti-virus application that has 2800 signatures, 99.9% of the state transitions are on one or two characters and they account for about 87% of the memory required. It is significant that even though only about 0.1% of the states are general purpose, they require about 13% of the memory.

Among sets of regular expressions (which are not all literal expressions), the occurrence of states with one or a few out transitions tends to be a smaller percentage of all the states and significantly smaller percentage of the memory required. For example, in an intrusion detection application, if 50% of the state transitions are one or two characters, they may account for a very small percentage, such as less than 1%, for example, of required memory.

Although both of the above optimizations can reduce memory consumption to a degree, typically a significant percentage of state block types are general purpose and their memory requirements dominate the total amount of memory needed by large pattern sets. One embodiment of the systems and methods described below reduces this problem by compressing the general purpose state transition instruction blocks. For example, an alternative representation for general purpose state transition blocks (STBs) is described parametrically, where the alternative representation uses less memory space, can represent any possible state configuration, and is implemented with only two memory accesses in one embodiment. Also, a variation is explained that is close to optimal but simpler to implement in hardware. Next, a method is described for organizing individually compressed STBs in memory and the mechanism needed for an engine to properly access them. Finally, when the execution engine is cache-based, a method is disclosed for performing dynamic decompression when a cache miss occurs so that instructions in the cache can be quickly accessed in their decompressed form.

System Overview

FIG. 1A is a block diagram illustrating one embodiment of a compiler 150 configured to generate state machines having compressed state instructions for use in a state machine engine 100, such as in a network server 140 that receives and transmits Internet data, for example. In one embodiment, the compiler 150 is a general purpose computer executing any suitable operating system and state machine generation software, such as software that compiles regular expressions into one or more DFAs. In the embodiment of FIG. 1A, the compiler comprises a state compression module 152, which may be part of the compiler software or a separate module that interfaces with the compiler software, configured to compress certain state transition instructions for use by the state machine engine 100. In one embodiment, the compiler 150 outputs a compiled state machine to the server 140, which makes the compiled state machine accessible to the state machine engine 100. In one embodiment, the state machine engine 100 is embodied in, for example, a network interface card (NIC), an application specification integrated circuit (ASIC), a field programmable gate array (FPGA), or other reconfigurable logic device. In certain embodiments, the compiled state machine from the compiler 150 is precoded in a hardware device, e.g., a NIC, that is coupled to the server 140. Depending on the embodiment, the modules of the state machine engine 100 may be implemented on multiple devices.

Figure 1B:
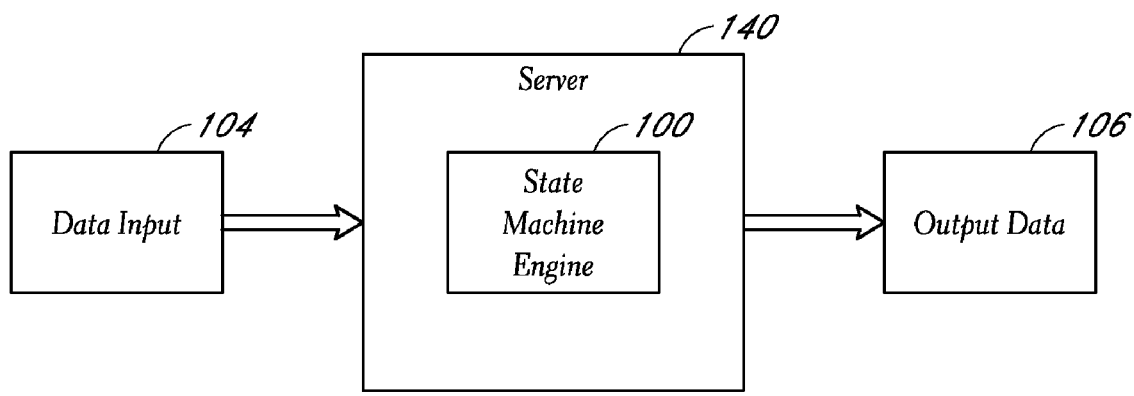
FIG. 1B is a functional block diagram illustrating the state machine engine of FIG. 1A, now storing the compressed state machine from the compiler, receiving an input data stream and outputting an output data.

FIG. 1B is a functional block diagram illustrating the state machine engine 100, now storing the compressed state machine from the compiler 150, receiving an input data stream 104 and outputting an output data 106. In one embodiment, the input data 104 comprises network traffic, such as email and/or website data, for example and the output data 106 comprises indication of matches to patterns of interest (e.g., viruses) within the input data 104. Due to the state compression that is applied by the state compression module 152, the state machine engine 100 may advantageously require less memory to store a state machine.

Figure 1C:
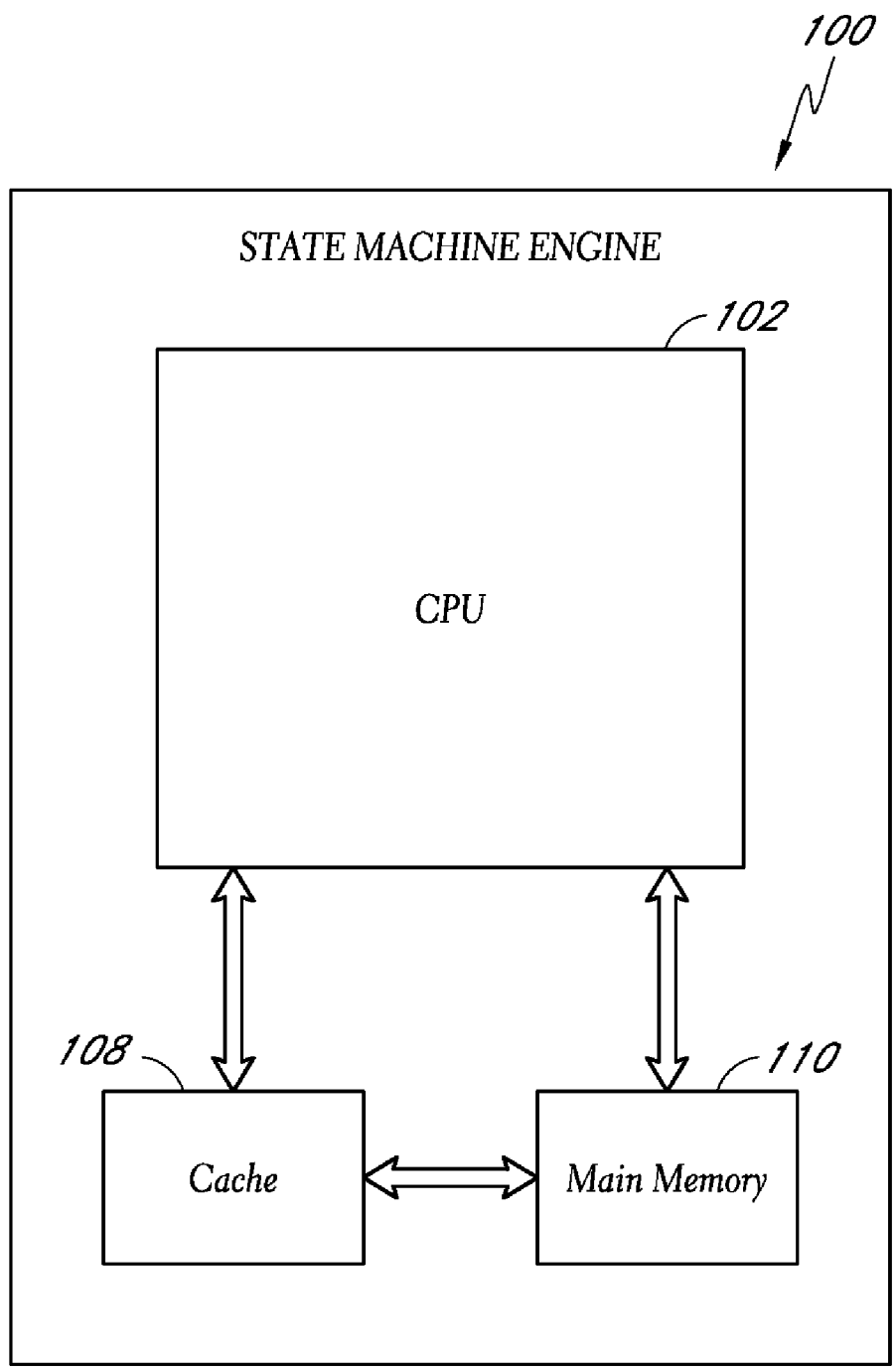
FIG. 1C is a block diagram illustrating one embodiment of the state machine engine of FIG. 1B.

FIG. 1C is a block diagram illustrating one embodiment of the state machine engine 100. In this embodiment, the state machine engine 100 comprises a central processing unit 102, a cache 108, and a main memory 110. In one embodiment, the modules of the state machine engine are provided in one or more ASICs, FPGAs, and/or other reconfigurable hardware logic devices. For example, in one embodiment a NIC comprises one or more ASICs that are configured to perform the functions of the CPU 102, memory 110, and/or cache 108. In other embodiments, the state machine engine 100 may be part of a general purpose computer or a dedicated processing unit for monitoring web traffic.

In the embodiment of FIG. 1C, the central processing unit 102 is connected to both a cache 108 and a main memory 110 configured to store, among other things, state machine instructions for inspection of content, such as from an input data stream received via a network (not shown). Both the cache 108 and main memory 110 may comprise electronic circuitry that allows information, typically computer data, to be stored and retrieved. The cache 108 or main memory 110 may also comprise external devices or systems, for example, disk drives or tape drives. The cache 108 or main memory 110 may also comprise fast semiconductor storage (chips), for example, Random Access Memory (RAM) or various forms of Read Only Memory (ROM), which are directly connected to the central processing unit 102. Other types of memory include bubble memory and core memory. In some embodiments, the cache 108 may be configured to have faster memory access and/or data transfer speeds than the main memory 110. In many cases, however, the cache is more expensive and thus smaller than the main memory 110.

Compression Method

Figure 2:
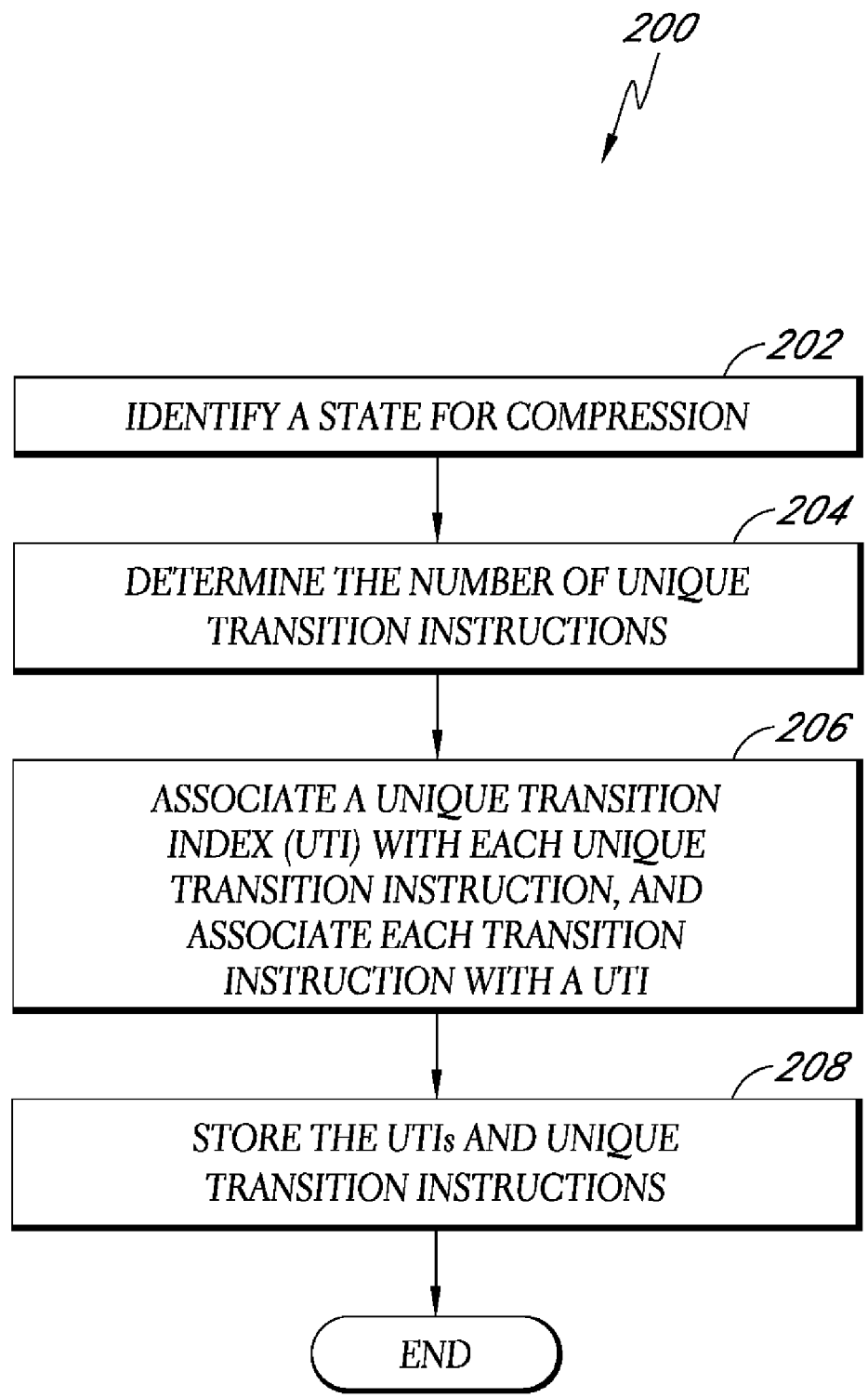
FIG. 2 is a flowchart illustrating one embodiment of a method of compressing a state transition instruction.

FIG. 2 is a flowchart illustrating one embodiment of a method of compressing a state transition block, where a state transition block (or STB) comprises a block of memory that stores data that may be used to determine one or more next states of a state machine. In one embodiment, the method of FIG. 2 is performed by the compiler 150 (FIG. 1). In other embodiments, the method of FIG. 2 may be performed by a general purpose computer, a specialized computer, FPGA, ASIC, or other computer hardware.

The method 200 of compressing a state (or state machine instructions) begins in block 202 by identifying a state for compression. In one embodiment, all states of a state machine are considered for compression by a method similar to the method of FIG. 2. In other embodiments, only certain states are compressed.

Next, in block 204, the compression system, such as the state compression module 152 of the compiler 150 (FIG. 1A) determines respective next states, each being associated with a respective input character and/or character class, for the identified state. How this occurs can be seen by reexamining the example previously given using the regular expression "cat[0-9]+". If character classes are not in use, the STB will include an entry for each of the digit characters. In the state reached upon the transition on 't', each of the digits will have a transition to the same next state because of the character class "[0-9]". If character classes are used, a similar phenomenon occurs when some of the digits are in their own class. In the latter example, where "[a-z]{2,8}tar7" is added to the expression, Classes 6 and 7 will transition to the same next state. Thus, when stored uncompressed in a memory, the same transition instruction would be stored at many different offsets from the same base address (e.g., associated with the several characters that each transition to the same next state). Thus, in block 204, the next states associated with possible input characters are determined. Depending on the embodiment, each transition instruction may be examined sequentially or multiple transition instructions may be examined in parallel.

In block 206, the first time a previously unseen next state is encountered, a unique transition index (UTI) is associated with the unique next state. The UTIs may then be associated with respective characters and/or character classes. In one embodiment, multiple characters and/or character classes are associated with a same UTI (and corresponding same transition instruction). The UTI associated with each unique transition instruction may be a contiguous indexing from zero to the number of unique transition instructions less one. The indices may also be non-contiguous so as to be more efficiently stored in a crowded memory.

Thus, a more compact representation of the same information is possible using a two-access indexing scheme. In this representation, one state consists of two sections, an Index Block (IB) and a Unique Transition Block (UTB). Together, they form a compressed state transition block (CSTB). FIG. 4 is a diagram of one embodiment of a compressed state transition block (CSTB). The size and configuration of each section depends on the number T of unique transition instructions contained in the original STB that are to be represented in this compressed format. The value of T can range from 1 to C. In one embodiment, each unique instruction is listed in the STB and is indexed from 0 to T−1. Each such index is referred to as a Unique Transition Index or UTI. In this embodiment, B bits are required to represent any UTI where $B=\lceil \log_2(T) \rceil$, $\log_2(T)$ is the base 2 logarithm of T, and $\lceil X \rceil$ is the ceiling function, which is defined as the smallest integer greater than or equal to X. For example, if T=56, then $\log_2(56)$=5.81, and $B=\lceil 5.81 \rceil$=6.

Given a memory word size of N bits, the number of UTIs that can be packed into one word is $I=\lfloor N/B \rfloor$, where $\lfloor X \rfloor$ is the floor function, which is defined as the largest integer less than or equal to X. For example, if N=64 and B=6, $I=\lfloor 64/6 \rfloor = \lfloor 10.67 \rfloor$=10. For a given value of C (the maximum number of transitions needed per state) the STB contains C UTIs of B bits each. This requires $W=\lceil C/I \rceil$ words of N-bit memory. For example, if C=156, I=10 and N=64, $W=\lceil 156/10 \rceil = \lceil 15.6 \rceil$=16 words of 64-bit memory. The total number of words required to represent this state is W+T. If A is the base address of this block, the IB words may be located at A, A+1, A+2, ..., A+W−1. The unique transition instructions may be located at A+W, A+W+1, ..., A+W+T−1. The positions in memory of the index block and the unique transition block may be switched in other embodiments.

In block 208, the UTIs are stored so that they are associated with their respective input characters and/or character classes. Advantageously, when multiple characters are associated with a same next state, the same UTI may be stored in memory and associated with those multiple characters, while the actual transition instruction is stored only once and referred to by the UTI. This storing is in opposition to storing each transition instruction corresponding to each possible character such that redundant copies of the same transition instruction would be stored.

In one embodiment, the below-described method may be used to convert a general purpose STB into a compressed STB. This may be done for every STB in the state machine.

1. Perform a binary insertion sort (or equivalent) on the instructions in the STB. Assume they're in an array called GPBlock[i], $0 \leq i < C$. The sort routine may be called once for each instruction. If the instruction is unique, it is added to the sorter's list at Sort[j] where j is the next available entry and the index, j, is returned indicating where the instruction was stored. The returned value j is the UTI for that transition. (The sort routine may maintain a separate array of sorted pointers to facilitate doing a binary search so that the location of the entries of Sort do not change.) If the instruction is already on the list, the UTI of its location is returned.
2. Store the $i^{th}$ returned index into UTIArray[i].
3. Compact the entries in UTIArray into W words with I entries each to form the Index Block in array IBlock. The number of entries in the sorter's list is T. From above, $B=\lceil \log_2(T) \rceil$, $I=\lfloor N/B \rfloor$, and $W=\lceil C/I \rceil$. For $0 \leq i < C$, place UTIArray[i] into UTI slot x=(i modulo I) which resides in bits xB through (x+1)B−1, low to high, of index word IBlock[w], where $w=\lfloor i/I \rfloor$.
4. Copy the unique entries in the sorter's list into the UTB portion of CBlock at indices from W through W+T−1. That is, for $0 \leq j < T$, IBlock[W+j]=Sort[j].

Although the algorithm is given in terms of instructions that represent transitions, it can be implemented equivalently by substituting next state indexes or IDs for the transition instructions.

Example of Compressed State Storage

Figure 5:
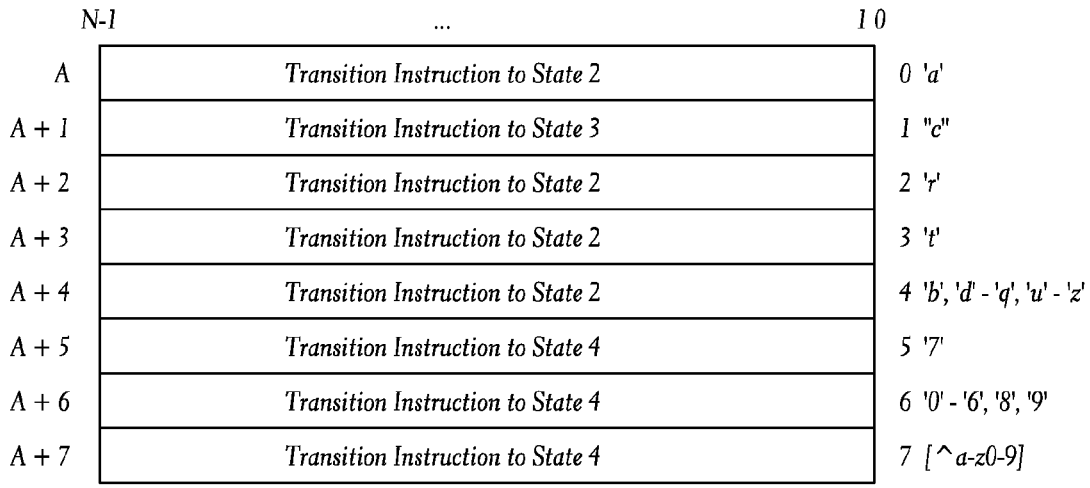
FIG. 5 is a diagram illustrating one embodiment of a general purpose state transition block as stored in a memory.

Understanding of this process may be facilitated by means of an example, which is provide for illustrative purposes and should not be construed to limit the scope of the systems and methods described herein. Taking the same two expressions used in the example above, namely "[a-z]{2,8}tar7", the following example uses the same 8 class definitions noted above. Thus, C, the total number of possible out transitions, is 8. The STB 500 for the start state is shown in FIG. 5 and the compressed version of it is in FIG. 6. Thus, FIG. 5 is a diagram illustrating one embodiment of a general purpose state transition block as stored in a memory and FIG. 6 is a diagram illustrating one embodiment of a compressed version of the state transition block of FIG. 5 as stored in a memory.

In the embodiment of FIG. 5, there are only three unique transition instructions (to Next States 2, 3, and 4). Thus, T, the number of unique transition instructions is three. The minimum number of binary bits needed to represent the indices to these three transitions (B) is two. Thus, for 64-bit words (N=64), the number of UTIs that can fit in a single word (I) is 32, and the number of words required to store all of the UTIs (W) is 1. Since W=1, only one IB word is needed and it is only partially used in this example.

Figure 6:
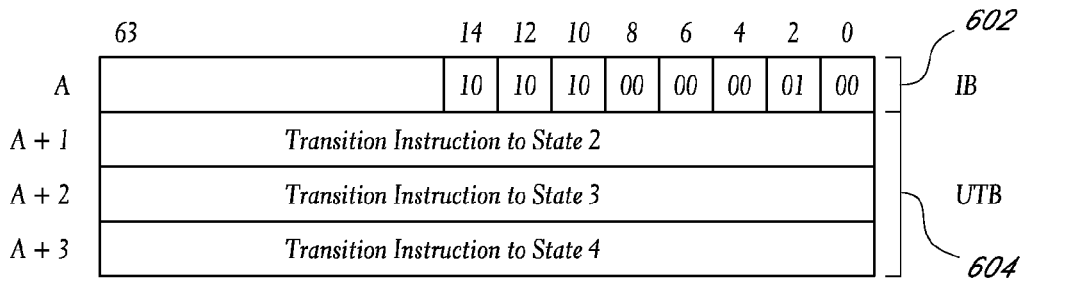
FIG. 6 is a diagram illustrating one embodiment of a compressed version of the exemplary state transition block of FIG. 5 as stored in a memory.

In the embodiment of FIG. 6, the compressed state transition block (CSTB) 600 comprises an Index Block (IB) 602 that stores the indexes associated with available character classes and a Unique Transition Block (UTB) that stores information regarding the specific transition instructions. In the CSTB 600, eight 2-bit UTI entries are used to store the UTIs associated with the 8 character classes illustrated in FIG. 5.

As illustrated in FIG. 5, the transition on Class 0 is to Next State 2. That is the first unique transition, so when compression is applied to this state transition block, it is assigned UTI 0. An entry of binary '00' is made in the first index location of the index block (IB) 602 which uses bits 1 and 0. The transition on Class 1 is to Next State 3. That is the second unique transition, so it is assigned UTI 1. An entry corresponding to Class 1 is made to the second index location of the index block using bits 3 and 2 where binary '01' is recorded. The transition on Class 2 is to Next State 2, which is already in the unique transition table at index 0. So an entry corresponding to Class 2 is made in the third index location of the IB 602 using bits 5 and 4 and the value is binary '00', corresponding to UTI 0. The process is repeated for Classes 3 and 4 which also referenced Next State 2 which uses UTI 0. For Class 5, the transition is to Next State 4, which is a new unique transition, so it is assigned UTI 2 in the unique transition list. The bits used by Class 5 in the IB 602 are 11 and 10 into which binary '10' is recorded. Classes 6 and 7 also transition to Next State 4, corresponding to UTI 2, so the same binary '10' is recorded into bits 13 and 12 and bits 15 and 14 in the index block. The UTB 604 may reside in addresses A+W, A+W+1, . . . to A+W+T−1, which in this case is A+1, A+2, and A+3. For this simple example, 8 memory words are required for the STB of FIG. 5 and only 4 words are required for the CSTB 600, so the compression ratio is 2. The resultant compressed STB 600 can be placed in memory wherever the compiler assigns it.

Although the UTI locations have been described as the least significant bits of the memory, they could also be stored in reverse order as the most significant bits of the memory. Similarly, the index block has been described as being in base memory with addresses less than the unique transition block. The reverse may be case. The index block and unique transition block may be separated in memory and need not be contiguous.

The general formula for the compression ratio, R, is a function of the number of classes in use, the instruction memory word size, and the number of unique transition instructions, C, N, and T, respectively:

$$R = \frac{C}{\lceil C / \lfloor N / \lceil \log_2 T \rceil \rfloor \rceil + T}$$

If T equals C, there is no compression to be had because an uncompressed STB contains C instructions, whereas in the compressed format, the UTB contains C transition instructions in addition to the Index words required by the IB. The table below shows the values of B, I, W, and R when N=64, C=256, and T varies from 2 to 224. The fewer the number of unique transitions there are in an STB, the higher the compression ratio. As the table shows, when T reaches 224, there is a break-even point in which this compressed format requires the same number of memory words as the original uncompressed STB. Beyond that, the larger T gets, the more expansion occurs. The point of diminishing returns occurs in the range of 128 to 160 unique transitions where the compression ratio ranges from 1.6 to 1.3. It is a designer's choice as to where to set the threshold. The selected value may be called $T_{THRESH}$. An STB may be called compressible if the number of its unique transitions is less than or equal to the threshold, e.g., $T \leq T_{THRESH}$.

As each additional IB word is required, there is an acceleration in the decline of the compression ratio, such as from T=16 to T=17. At that point, then number of bits per UTI, B, changes from 4 to 5, the number of UTIs per word, I, drops from 16 to 12, and the total number of IB words, W, jumps from 16 to 22.

TABLE 1

Compression Ratio for various values of T when N = 64 and C = 256
N = 64, C = 256

| # Unique Transitions T | Bits/ UTI B | UTIs/ Word I | Words of UTI W | Compression Ratio R |
|---|---|---|---|---|
| 2 | 1 | 64 | 4 | 42.7 |
| 3 | 2 | 32 | 8 | 23.3 |
| 4 | 2 | 32 | 8 | 21.3 |
| 5 | 3 | 21 | 13 | 14.2 |
| 8 | 3 | 21 | 13 | 12.2 |
| 9 | 4 | 16 | 16 | 10.2 |
| 16 | 4 | 16 | 16 | 8.0 |
| 17 | 5 | 12 | 22 | 6.6 |
| 32 | 5 | 12 | 22 | 4.7 |
| 33 | 6 | 10 | 26 | 4.3 |
| 64 | 6 | 10 | 26 | 2.8 |
| 65 | 7 | 9 | 29 | 2.7 |
| 128 | 7 | 9 | 29 | 1.6 |
| 129 | 8 | 8 | 32 | 1.6 |
| 138 | 8 | 8 | 32 | 1.5 |
| 160 | 8 | 8 | 32 | 1.3 |
| 223 | 8 | 8 | 32 | 1.004 |
| 224 | 8 | 8 | 32 | 1.000 |

The compression ratio also varies with N and C. The table below shows the compression ratio achieved when N has values of 16, 32, 36, and 64; C has values of 128, 195, 256, and 258; and T has values of 2, 4, 8, and 128.

TABLE 2

Compression Ratio as a function of N, C, and T
Compression Ratio

| C | T | N | | | |
|---|---|---|---|---|---|
|   |   | 64 | 36 | 32 | 16 |
| 256 | 2 | 42.7 | 25.6 | 25.6 | 14.2 |
| 256 | 4 | 21.3 | 13.5 | 12.8 | 7.1 |
| 256 | 8 | 12.2 | 8.5 | 7.5 | 4.3 |
| 256 | 128 | 1.6 | 1.4 | 1.3 | 1.0 |
| 258 | 2 | 36.9 | 25.8 | 23.5 | 13.6 |
| 258 | 4 | 19.8 | 13.6 | 12.3 | 7.0 |
| 258 | 8 | 12.3 | 8.6 | 7.6 | 4.3 |
| 258 | 128 | 1.6 | 1.4 | 1.3 | 1.0 |
| 195 | 2 | 32.5 | 24.4 | 21.7 | 13.0 |
| 195 | 4 | 17.7 | 13.0 | 11.5 | 6.7 |
| 195 | 8 | 10.8 | 7.8 | 7.0 | 4.1 |
| 195 | 128 | 1.3 | 1.2 | 1.1 | 0.9 |
| 128 | 2 | 32.0 | 21.3 | 21.3 | 12.8 |
| 128 | 4 | 16.0 | 10.7 | 10.7 | 6.4 |
| 128 | 8 | 8.5 | 6.7 | 6.1 | 3.8 |
| 128 | 64 | 1.7 | 1.5 | 1.4 | 1.0 |

When the number of character classes, C, is 256, that gives an optimal packing of UTIs in a 64-bit word (eight 8-bit UTIs per word) and produces a higher compression ratio for almost all other combinations of C and N for a selected value of T. When C=258, 9 bits are needed per UTI, so the compression ratio is lowered by needing extra IB words. When character classes are in use and result in significantly smaller values of C, the STB becomes more compact and that reduces the compression ratio. For smaller memory word sizes, N, the compression ratio is reduced because more Index words are required in the IB. For example, when T=2 and N=64, the number of IB words, W, required is 4 whereas if N is reduced to 32, W doubles to 8.

In one embodiment, one predetermined character class, e.g., character class 0 or simply CCL0, is treated specially, by assuming the UTI associated with that class is always a predetermined index, such as index 0 or simply Ind0. For example a "last accepting state" class may be treated in this manner. This assumption can be guaranteed by the compiler, if desired, because the compiler may place whatever UT is associated with CCL0 at the location associated with index Ind0. For example, the UT associated with the "last accepting state" class may be placed at the location associated with index zero. The result of this optimization is that whenever a compressed state is accessed using CCL0, only one access to memory is required, as a first access to retrieve an index word with the UTI is not required, since it is already known that the UTI is Ind0, and only the second access to retrieve the UT itself is performed.

Organization and Management of Compressed Blocks of Varying Sizes

In one embodiment, a new transition instruction may include information the execution engine can use to find the next instruction to fetch based on the current state and present input character or class. FIG. 7 is a diagram illustrating exemplary fields of a transition instruction for a compressed state. In one embodiment, there is an Opcode field 702 that indicates the instruction type, which in this case is compressed STB. There are various control bits that may be contained in one or more control fields 704, such as those discussed in the commonly owned U.S. patent application Ser. No. 11/422,312, filed Jun. 5, 2006, and titled "SYSTEMS AND METHODS FOR PROCESSING REGULAR EXPRESSIONS," which is hereby incorporated by reference in its entirety. Many different organizations of IB words may be used to cover all the cases, so there is a Compression Type field 706 to indicate which arrangement this block uses. The boundary between IB and UTB blocks is variable, so the size of the IB (W) is indicated in the Index Depth field 708. Alternatively, if the UTB comes first within a CSTB, the Index Depth field 708 is the offset to the beginning of the IB within the CSTB. Finally, the Base Address field 710 indicating a memory location for the beginning of the CSTB for the particular state may be included. In other embodiments, a transition instruction for compressed data may include fewer or additional fields and the fields may be arranged differently than as indicated in FIG. 7.

Based on the exemplary formulas above, the largest possible value of T for which it is meaningful to use a compressed format in the example above is 224. Therefore, the largest meaningful value of B, the number of bits per UTI, is $\lceil \log_2(224) \rceil = 8$. The smallest meaningful value is B=1, needed when there are only one or two transitions from which to choose. If there is only one transition required, alternatively one would not actually need an IB since it will contain all 0's. One would only need to store the one transition, so that could be implemented as a special case. One embodiment handles that case with the same mechanism used when there are two unique transitions.

FIG. 8 is a diagram showing one embodiment of index packing for a 64-bit memory slot for various values of bits per index. A value of N=64 is used in the figure for the purposes of illustration. In each case where the number of bits needed is a power of 2, there are no unused bits in the IB word. Otherwise, fragmentation occurs and there are either 1 or 4 unused high order bits. Given there are eight configurations in the example above, the size of the Compression Type field in FIG. 7 would need to be 3 bits. FIG. 8 lists the type values from 0 to 7 and their corresponding UTI locations within the exemplary 64 bit word.

Next, consider the number of bits needed for the Index Depth field. The possible values for W run from 1 to $\lceil C \cdot N/B \rceil$, where the largest anticipated value of C is 258 and the maximum value of B established above is 8. The maximum value of W is $\lceil 258/\lfloor N/8 \rfloor \rceil$. The number of bits needed to represent it is $\lceil \log_2(\lceil 258/\lfloor N/8 \rfloor \rceil) \rceil$. In the case of N=64, that is 6 bits. That value is the same for a C as large as 504 before another bit is needed. Storing the value of W in the Index Depth field may be done if sufficient bits are available. If not, an alternative may be used. Examining the formula for W, consider each of the parameters. N may be fixed for a given execution engine implementation. B may be uniquely determined by which of the eight compression types is in use. For a given set of expressions, C may be a fixed value. Thus, in one embodiment a small lookup table whose contents are determined by the compiler may be used to determine an appropriate Index Depth value. The table may be loaded at the same time the state machine transition instructions are loaded. The 3-bit Compression Type field selects one of eight Index Depth values stored in the look-up table. The width of the look-up table may be the maximum width of W, e.g., 6 bits when N=64.

FIG. 9 is a diagram showing one embodiment of an index block for a 64-bit memory slot, using 6 bits per unique instruction index, and 128 unique transition indices. FIG. 9 illustrates the usage of exemplary compression format Type 5 (FIG. 8) which may be used when T=56, so B=6. In this example, N=64 and C=128, so $W = \lceil 128/\lfloor 64/6 \rfloor \rceil = \lceil 128/10 \rceil = 13$. Using this compression format, thirteen IB words are used to store the 128, 6-bit UTI entries as shown. In this embodiment, the last word (index offset 12 in FIG. 9) only contains 8 UTIs. The complete CSTB may also contain the 56 unique transition instructions immediately following the last IB word.

Two-Cycle Fetch of Transition Instructions

In one embodiment, when a state machine engine, e.g., state machine engine 100 of FIGS. 1A, 1B, 1C, fetches a compressed instruction it performs two memory fetches to obtain the correct transition instruction. The first is to fetch the IB word containing the UTI corresponding to the current character or class. The second is to fetch the needed transition instruction, such as by using the Base Address, Index Depth, and UTI extracted from the fetched IB word. In one embodiment, the first effective address is calculated by the formula: $EA_1 = A + \lfloor x/I \rfloor$, where A is the Base Address of the current instruction, x is the present input which is a character or character class, and I is the number of UTIs per index word. The floor function may be used because indexing starts at 0. I is uniquely determined by the Compression Type field of the current instruction since it is a function of T and N, which is a constant for a particular implementation. In other embodiments, the location of the appropriate transition instruction may be determined in other manners.

In one embodiment, a lookup table (LUT) may be used to convert the Compression Type into the corresponding value of I. With reference to the example of FIGS. 5 and 6, an 8 entry by 7 bit lookup table (LUT) may be used to convert the 3-bit Compression Type into the corresponding value of I, which at most is a 7-bit number. Then integer division of x by the looked-up value of I may be performed to obtain an offset to add to A. However, implementing division in hardware is expensive, so another embodiment is to use a lookup table to directly obtain the offset and then add that to A. The size of the LUT may depend on the maximum value of C that could be in use. For example, if $C_{max}=258$, then 9-bits are needed to represent it and those may be concatenated with the 3-bit Compression Type value to form the input (address select) to the table. Thus, $2^{(9+3)}=4K$ entries are needed. If $C_{max}$ were 256, then 2K would suffice. The number of bits of output needed is $\log_2(\lfloor C_{max}/I_{min} \rfloor)$. I is minimum when B is maximum which occurs with Compression Type 7 so $I_{min} = \lfloor N/B_{max} \rfloor = \lfloor N/8 \rfloor$. For N=64, $I_{min}=8$ and $\log_2(\lfloor 258/8 \rfloor)=5$ bits. The contents of the LUT never change once N is selected, so they can either be hardwired (e.g., stored in a nonvolatile read-only memory) in the execution engine or loaded whenever the engine is initialized.

The next step is to calculate the second effective address, $EA_2$, by extracting the needed UTI from the returned IB word and add it to the sum of the Base Address (A) and the Index Depth (W) of the current instruction. The calculation of A+W can be performed in parallel with calculation $EA_1$ and the result stored in a register for use in this step, for higher performance. Functionally, the needed UTIs position within the IB word is X=(x modulo I), which is the remainder when x is divided by I using integer division. This may be expensive to implement in hardware, so a lookup table may be used instead. The inputs to the table may be identical or similar to those described above for obtaining the $EA_1$ offset $\lfloor x/I \rfloor$, so the width of the table may be extended and simultaneously retrieve that value and X. The maximum value of X occurs with Compression Type 0 where I=N, so $\lceil \log_2(N) \rceil$ bits are needed. If N=64, then I=64, so 6 bits are needed. This makes the width of the LUT 11 bits. Since that lookup occurs in the calculation of $EA_1$, we can save the result in a register for use in the calculation of $EA_2$.

In another embodiment, the floor and remainder of the quotient x/I may be calculated use a multiplier that yields the desired quotient. Use of a multiplier may be less 'expensive' in terms of logic or computation time than use of a divider or lookup table. In one embodiment, the multiplier multiplies x by the inverse of I (1/I), which yields the desired quotient. Since there are not many I values employed, and I may be retrieved from a table according to the compression type, the inverse of I may also be retrieved from the same table. After computing $x*(1/I)=(x/I)$, the floor can be taken by dropping the fractional portion, and the remainder (modulus) by dropping the integer portion and multiplying the fractional portion by I. In other embodiments, these calculation may be performed in any other suitable manner.

In one embodiment, to extract the target UTI from the returned IB word, a two stage bank of multiplexers may be used with X as the control input of the first stage and the Compression Type of the current instruction as the control of the second stage. With reference to the example above, the first stage may have eight sets of multiplexers, one per compression type. For Type 0, a single N-to-1 mux may suffice and may require all $\lceil \log_2(N) \rceil$ bits of X to make the single bit selection. For Type 1, two $\lceil N/2 \rceil$-to-1 multiplexers may be used, each controlled by the $\lceil \log_2(\lfloor N/2 \rfloor) \rceil$ least significant bits of X and a two-bit output.

In general, for Type k, $0 \leq k \leq 7$, k+1 $\lceil N/(k+1) \rceil$-to-1 multiplexers are used, each controlled by the $\lceil \log_2(\lceil N/k \rceil) \rceil$ least significant bits of X. The output is k+1 bits. These eight outputs are logically selected by an 8-to-1 8 bit second stage mux controlled by the three bit Compression Type value. The following table lists the sizes and quantities of multiplexers needed when N=64.

TABLE 3

Multiplexers needed to extract a UTI when N = 64 versus Compression Type

| Compression Type | Multiplexer Size | Quantity | Control Input Bits |
|---|---|---|---|
| 0 | 64:1 | 1 | 6 |
| 1 | 32:1 | 2 | 5 |
| 2 | 21:1 | 3 | 5 |
| 3 | 16:1 | 4 | 4 |
| 4 | 12:1 | 5 | 4 |
| 5 | 10:1 | 6 | 4 |
| 6 | 9:1 | 7 | 4 |
| 7 | 8:1 | 8 | 3 |

With X obtained as the output of the two-stage multiplexer, that value is added to the previously computed value of A+W to yield $EA_2$. That is the address of the next instruction to execute.

Alternative Compression System and Method

The amount of hardware needed to implement an execution engine may be reduced if some modifications are made at the expense of reducing the compression ratio. Some of the most expensive (measured in logic gates) operations required are calculation of the quotient, $\lfloor x/I \rfloor$, and remainder, (x modulo I) which requires a single integer division or use of a lookup table with 4K entries of 11 bits, for example. The latter may require 8 KBytes unless a custom memory is designed. If I is limited to being a power of two, then the integer division may comprise a right shift that can be accomplished with a multiplexer yielding the quotient and remainder in one operation. That, in turn, may require that N and B are both powers of two. N generally is a power of two with typical values being 32 or 64. Even if it is not, for example, N=36, it can be treated as if it were the nearest lower power of two, e.g., 32, when used for storage of the index block.

In general, the formulas given earlier can be modified as follows for implementation of this compression method. To adjust N to be a power of two, compute $N'=2^{\lfloor log_2(N) \rfloor}$, which will calculate the next lower power of two if N is not already a power of two. As before $B=\lceil log_2(T) \rceil$. Since B may not be a power of two, calculate $B'=2^{\lceil log_2(B) \rceil}$, which is the nearest larger power of two. Then $I'=\lfloor N'/B' \rfloor$ and $W'=C/I'$.

In some embodiments, the values for B' are 1, 2, 4, and 8. This only requires four compression types whose index word formats are illustrated in FIG. 10 for N'=64. FIG. 10 is a diagram showing one embodiment of index packing for a 64-bit memory slot for various power-of-two values of bits per index. FIG. 11 is a diagram showing an embodiment of unique transition instruction index locations used for various values of bits per index. FIG. 11 illustrates how values of B that are 3, 5, 6, and 7 (e.g., non-powers-of-two) are placed within the available index formats. FIG. 12 is a diagram showing an exemplary index block for a 64-bit memory slot, using 7 bits per index, and 128 unique transition instruction indices. FIG. 12 is thus an example of a complete IB for N=N'=64, C=128, and T=56 so that B=6, so B'=8 and we use the power of two compression Type 3 where 8 bits are available for each UTI. I'=8 and W'=16, e.g., sixteen IB words are used. Contrast this with FIG. 9, where only 13 words are used. Although this is suboptimal, the size difference is small. This CSTB requires a total of 72 memory words versus 69. That amounts to only a 4.3% increase in size.

The implementation of a state machine execution engine to interpret these formats is further simplified as follows. If only four formats are needed, the Compression Type field in the transition instruction only uses 2 bits. With only four compression types, the logic required to select a UTI from a returned Index word in calculating $EA_2$ is less than half that of the optimum implementation. The table below shows the needed multiplexers for N=N'=64.

TABLE 4

Multiplexers needed to extract a UTI when N = 64 versus Power of Two Compression Type

| Compression Type | Mux Size | Quantity | Control Bits |
|---|---|---|---|
| 0 | 64:1 | 1 | 6 |
| 1 | 32:1 | 2 | 5 |
| 2 | 16:1 | 4 | 4 |
| 3 | 8:1 | 8 | 3 |

Final selection of the four outputs from the first stage may be done by a 4-to-1, 8-bit wide second stage mux controlled by the two-bit Compression Type value.

Storage in Memory

Using either method for compacting STBs, the process of performing the compaction can be implemented as an augmentation to a compiler that converts regular expressions into a state machine, such as an FPGA, ASIC, or other configurable and/or reconfigurable hardware configured to perform compiler operations, or a compiler software executing on the state machine engine 100. Since the compiler can keep track of the size of each CSTB, there is no limitation on where they can be placed in memory. Base addresses can be assigned so they follow one after another. This applies to execution engines that directly access state instruction memory, making two accesses for each compressed state encountered. The compiler can choose whether to compress a state or not. Since twice as many memory accesses are needed to execute state transitions for compressed states versus those which are not, some optimizations are possible. For example, in applications in which it is typical to not find any matches, e.g., virus scanning, the compiler can choose not to compress states that are just a few transitions from the start state and compress those that are farther away. In such applications, the execution engine spends most of its time making transitions that are near the start state. For most of the input strings it scans, only the first few bytes of any signature will agree with the input examined before the match fails and scanning continues from the start state. User-supplied directives can also guide the compiler as to how much compression should be applied and under what circumstances.

For state machine execution engines that are cache-based, benefits of state compression while minimizing the impact of needing two memory accesses per compressed fetch may be realized. In this case, a state may be decompressed when it is fetched from secondary memory and stored in the cache in uncompressed form. Then instruction accesses from the cache may be single cycle regardless of whether the instruction comes from a compressed or normal state. For this to work properly, the compressed instructions may be segregated from the uncompressed instructions in virtual address space to assure that entries in the cache are unique. One method is to place uncompressed state blocks into the low half of the available virtual address space and compressed state blocks into the high half. Alternatively, the division can be on any selected boundary, consistent with the considerations given below for translating virtual to physical addresses. The opcode field of the current instruction signals to the execution engine whether the base address should be interpreted as referring to a compressed block or not.

The virtual address for uncompressed instructions can be the same as their physical address in memory. In this embodiment, the addresses for compressed instructions, however, must be translated. Assume the size of the virtual address space is $2^n$, then the virtual address has n bits numbered from n−1 to 0, from most significant to least. First we need to normalize the base address of a CSTB by subtracting the boundary between uncompressed and compressed virtual address regions. If compressed STBs are in the high half, this may be accomplished by masking off the most significant bit of the address, bit n−1. Otherwise, the actual boundary value can be subtracted. Setting the boundary to be a power of two, say $2^j$, subtraction is performed on only the n−j high order bits rather than n. By placing CSTBs in virtual space at equidistant intervals, the interval being big enough to contain the largest block, the address (excluding the most significant bit assuming the simplest method) can be divided by the size of the interval in order to obtain an index uniquely identifying that block. If the interval is power of two, no division is necessary. For example, for and interval size of $2^k$ and a virtual address space of $2^n$, bits k−1 through 0 may be ignored and the most significant bit, n−1 may form the index from bits n−2 through k. This provides $2^{(n-k-1)}$ unique indexes. For example, if the virtual address space is 256 MegaWords, so n=28, and the interval is 512 Words (to accommodate a $C_{max}$ of 258), so k=9, then there are $2^{(28-9-1)}=2^{18}=256K$ indices available, supporting that many CSTBs. This index may then be used to access an array that contains the physical address of that virtual CSTB. The physical address can then be combined with one or more of the Compression Type, Index Depth, and current character, x, to retrieve the next instruction as described earlier. One advantage to this scheme may be that it allows for arranging compressed state blocks as compactly as possible in memory. In one embodiment, the method uses a third memory access to perform the virtual to physical address translation and a translation table of significant size that may reduce the compression ratio compared to the non-cached implementations. One embodiment uses a more sophisticated scheme that eliminates the need for the translation table and consequently, the extra memory access.

In one embodiment, the compiler organizes CSTBs according to their type and within each type, the physical CSTBs are all the same number of memory words in size. By doing so, within each type, a given CSTB can be referenced by its block index number. Each type will require a loadable Type Base Address (TBA) register and a Type Size register. The former contains the address of the physical location of the start of the CSTBs of that type and the latter, the size of the respective CSTB in words. Finding the physical base address for a given CSTB requires knowing only its type and index. The index is multiplied by its type's size and added to its type's base address. Once the physical base address is known, the procedures described earlier are used to fetch the next state transition instruction.

The elegance of this approach is that the needed information may be stored in the instruction's base address field in such a way that it can be interpreted as either a unique virtual address or as the parameters needed to calculate the physical address. FIG. 13 is a diagram showing an embodiment of a base address field that is configured for interpretation as a virtual or physical address for a cache-based engine. In the embodiment of FIG. 13, the most significant bit of the address, bit n−1, is set to 1 according to one compressed STB memory organization scheme. The next field is t bits wide and is the Compression Type field, then the Block Index field which is p bits wide, and lastly, space is left which is the width of the largest class value, c bits, where $c=\lceil\log_2(C_{max})\rceil$. For example, if C=258, then c=9. With eight compression types in use, t=3. If n=28, then p can be a large as 28−1−3−9=15. In this example, there can be $2^{15}=32,768$ entries per compression block type. If the total number of classes needed is smaller, more bits can be used for each block index. If all the available entries become consumed for a given compression type, the next larger type can be used with some degradation of the net compression ratio achieved.

When a transition from a CSTB is first fetched by the execution engine, the procedure used is as described earlier. The instruction fetched is that required when the present input is class x, so when the instruction arrives, it is placed in the cache with virtual address constructed by inserting x into the least significant c bits of the present instruction's base address field. In subsequent operation, when an execution engine is processing a current instruction that has a compressed type, it can check the cache for the presence of the next instruction by inserting the present class, x, into the least significant c bits of the present instruction's base address field and check for a hit. For high performance, the calculations needed for fetching a miss can be performed concurrently with these operations to check for a hit so no time is lost if a miss occurs.

Although the implementation just described covers the minimum functional requirements, it is not necessarily optimal in memory usage. For a given compression format, the range in number of instruction words required for the CSTBs that use it is significant. This is computed for each format in Table 5 below. For example, the worst case is compression type 6 where there could be 63 unused words of memory. Consequently, the array that contains blocks of that type will have fragmentation or wasted space in those entries where the maximum block size is not required. Furthermore, in some state machines, not all format types are required. These two issues can be addressed by adding a loadable Array ID (AID) table to the state machine execution engine that contains parameters characterizing each array. The AID table may, for example, contain at least one entry per format type to cover the case where all formats are in use. However, at the designer's discretion, it may support more entries, 16 for example. The compiler may then optimize memory usage by selecting block sizes for each array based on the characteristics of the actual CSTBs needing storage. The parameters in the AID table may include the block size, the base address of the array in memory, the compression type or format, and W, the offset that locates the beginning of the Unique Transition section of each block. With these facilities, several arrays can be assigned to compressed blocks that use the same format, but that vary in size, minimizing wasted space.

Another issue that can occur with the instruction format of FIG. 13 relates to cache performance. For some values of the parameters, cache performance could be negatively affected depending on the design of the cache's addressing mechanism. For example, a typical cache address implementation uses the least significant k bits of the virtual address as the physical address in the cache to store a saved instruction along with the rest of its full address and other status information. In an n-way, set-associative cache implementation, each such physical address contains n slots for managing collisions, so that up to n unique instructions whose addresses have the same k low order bits can be stored. When the n+$1^{st}$ collision occurs at a given location, one of the existing entries is replaced. With reference to FIG. 13, for example, the least significant bits of that address format consist of the character class value. The worst case number of bits for the class value have to be reserved in the format, but for a given compiled rule set, they may not all be in use. Consequently, the full range of cache addresses will not be used, causing excessively high collision rates on those that are, among compressed instruction fetches. If the block address were moved to occupy the least significant bits of the address (the character class value would be placed in higher order bits), the problem manifests in another way. A given rule set may have very few entries in some of the arrays, so that the range of index values does not cover the full range of $2^k$ cache locations. Again, this may cause a high collision rate among a subset of the cache's addresses, which hurts performance.

FIG. 14 is a diagram showing an embodiment of a base address field, such as the base address field 710 of FIG. 7, that resolves both of these issues. In this embodiment, the character class is stored in the most significant bits in the character class (CCL) field. In one embodiment, the character class is not in the instruction when it is fetched, but space is reserved for it. In this embodiment, at runtime the character class gets filled in with the CCL that caused that compressed transition instruction to be fetched. In the embodiment of FIG. 7, a CCL field having nine bits is shown, but the bits allocated can be selected to accommodate the largest class value the designer anticipates. The next field is the Array ID. If there are a maximum of A arrays supported $\lceil \log_2(A) \rceil$ bits are required. For example, 16 arrays require a 4-bit field. The Array Index may advantageously have enough bits to accommodate the largest number of array entries the designer anticipates will be needed. In FIG. 14, 24 bits are assumed, which supports a maximum of $2^{24}=16$ Mega Entries per array. The compiler may be configured to assure this number is not exceeded. The least significant 10 bits shown are a Hash value computed by combining the 10 least significant bits of the Array Index and the CCL as follows, where Hash[i] is the $i^{th}$ bit of the Hash value and $\oplus$ is the exclusive- or logical operation:

Hash[0]=ArrayIndex[0]
Hash[1]=ArrayIndex[1] $\oplus$ CCL[8]
Hash[2]=ArrayIndex[2] $\oplus$ CCL[7]
Hash[3]=ArrayIndex[3] $\oplus$ CCL[6]
Hash[4]=ArrayIndex[4] $\oplus$ CCL[5]
Hash[5]=ArrayIndex[5] $\oplus$ CCL[4]
Hash[6]=ArrayIndex[6] $\oplus$ CCL[3]
Hash[7]=ArrayIndex[7] $\oplus$ CCL[2]
Hash[8]=ArrayIndex[8] $\oplus$ CCL[1]
Hash[9]=ArrayIndex[9] $\oplus$ CCL[0]

The Hash field may align with and have as many bits as are used for the physical address of the cache. In one embodiment, the Hash values are computed by reversing the bits of the CCL and aligning the resultant least significant bit with the most significant bit of the Hash before applying an exclusive- or logical operation on each pair of aligned bits. The bit of the Array Index used in computing the Hash is the same as the Hash bit. This can be expressed parametrically, where the CCL is c bits and the cache address is k bits:

Hash[i]=ArrayIndex[i], $0 \leq i < k-c$, $c < k$
Hash[i]=ArrayIndex[i] $\oplus$ CCL[k-i-1], $k-c \leq i < k$ Constructing the Hash this way will yield a good distribution of addresses used in the cache even if there is a small number of character classes in use and/or if the number of array entries is small. If the more significant bits of the CCL are 0's, the Array Index low order bits will cause the Hash value to vary. Similarly, if the more significant bits of the Array Index are 0's, the less significant bits of the CCL will cause the higher order bits of the Hash to vary.

When there is a cache hit, the proper Array Index can be reconstructed by repeating the Hash calculation using the stored CCL value. That works because Hash[i] $\oplus$ CCL[k-i-1]=ArrayIndex[i] $\oplus$ CCL[k-i-1] $\oplus$ CCL[k-i-1]=ArrayIndex[i] $\oplus$ 0=ArrayIndex[i].

Memory Access

Figure 15:
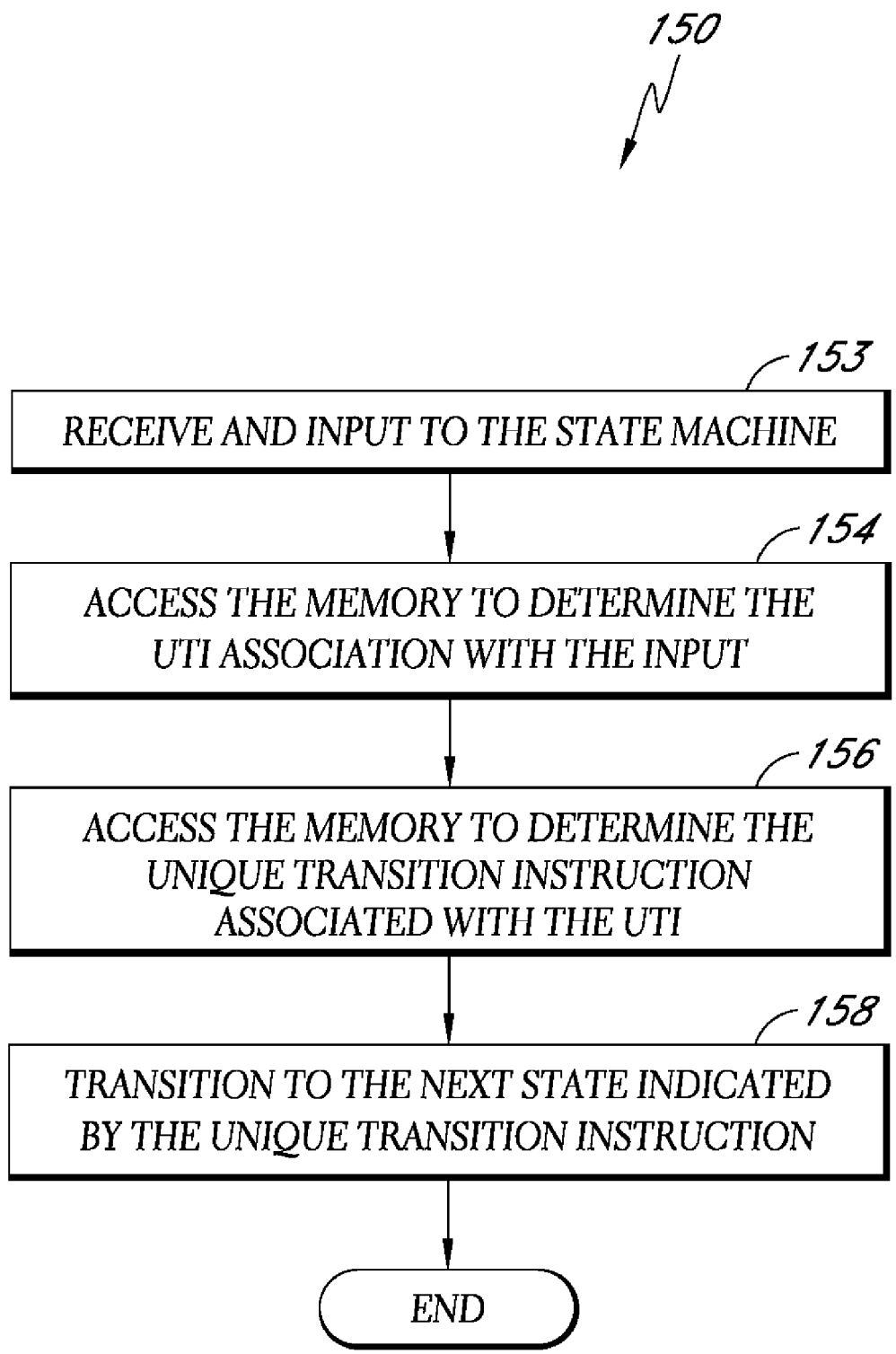
FIG. 15 is a flowchart illustrating one embodiment of a method of performing a state transition from a first state to a next state when the instructions are compressed.

FIG. 15 is a flowchart illustrating one embodiment of a method of performing a state transition from a current state to a next state. In one embodiment, the method of FIG. 15 may be performed by a state machine engine, such as the state machine engine 100 of FIG. 1. As noted above, the state machine engine 100 may be comprised in one or more FPGAs or ASICs, for example, software, and/or firmware configured to traverse a compressed state machine in response to a received input data stream. Depending on the embodiment, the method of FIG. 15 may include fewer or additional blocks and the blocks may be performed in a different order than is illustrated.

The method 150 begins in block 153 with the receipt of an input character, such as from a data stream received via a network 112. Alternatively, input characters may be received from a keyboard as characters are entered, or from a keypad as digits are input.

Next, in block 154, a first memory access is performed to determine the unique transition index (UTI) associated with the input. For example, a UTI instruction word comprising a UTI associated with the input character may be accessed and the particular UTI associated with the input character may be determined in the instruction word. As noted above, there are many memory configurations for storing UTIs in an instruction block (IB) and many optimizations for determining how many IBs to store in each instruction word. Generally, though, block 154 comprises accessing an index block (IB) in memory to determine an address of a state transition associated with the received character.

In block 156, a Unique Transition Block (UTB) is accessed, either in a same memory as the IB or a different memory, to determine the transition instruction associated with the UTI. For example, the index retrieved from the IB may indicate an address or address offset associated with the appropriate transition instruction.

Finally, in block 158, the state machine executes the transition instruction indicated by the retrieved index in order to transition to a next state and/or provide some output, such as a match token, for example. The process may return to block 152 to receive the next input, or the process may terminate. The process may repeat in the case of a stream of data where a plurality of input characters are evaluated by the state machine. The process may terminate if there is a match between the input(s) and a pattern being searched for by the state machine.

In an embodiment where each CSTB of the same size consumes the same number of words in memory, whenever the actual number of unique transitions is less than a power of two, some words will be unused. The worst case occurs when the size needed is one larger than a power of two. The impact of this is illustrated in the table below for the case where N=64 and $C_{max}$=258. The worst case value is shown for each of the compression types and the average value is in the next column. Assuming a uniform distribution of unique transition sizes, the average would be expected to be half of the worst case. That last column shows this as a percent of the total size of the CSTB. The percentages range from 4% to 20% and tend to increase as the block size increases.

TABLE 5

Example for N = 64, C = 258. Table shows average unused
words when CSTBs of the same type are forced to be the same size.

| | | | | | Optimum CSTB Sizing | | | |
| --- | --- | --- | --- | --- | --- | --- | --- | --- |
| Compression Type | Bits per Index (B) | UTIs per Word (I) | Words of Index (W) | Maximum Unique Transitions | CSTB Size (Words) | Worst Case Unused Words | Average Unused Words | Average Percent Increase |
| 0 | 1 | 64 | 5 | 2 | 7 | 1 | 0.5 | 7% |
| 1 | 2 | 32 | 9 | 4 | 13 | 1 | 0.5 | 4% |
| 2 | 3 | 21 | 13 | 8 | 21 | 3 | 1.5 | 7% |
| 3 | 4 | 16 | 17 | 16 | 33 | 7 | 3.5 | 11% |
| 4 | 5 | 12 | 22 | 32 | 54 | 15 | 7.5 | 14% |
| 5 | 6 | 10 | 26 | 64 | 90 | 31 | 15.5 | 17% |
| 6 | 7 | 9 | 29 | 128 | 157 | 63 | 31.5 | 20% |
| 7 | 8 | 8 | 33 | 160 | 193 | 31 | 15.5 | 8% |

Some state machine execution engines support instruction blocks that only require a small number of memory words, such as two or four, in an uncompressed format. For such engines, the compiler can keep track of where the unused memory words are among the compressed words and place small uncompressed instructions there, recovering the space. For example, for Compression Type 5 in Table 5, in the worst case, there could be 31 unused words. They would accommodate 7, 4-word instruction blocks or 15, 2-word blocks or a combination of the types.

The address calculation to obtain the physical base address of a particular CSTB may include multiplying a Block Index by its Type Size. For example, this could require a 16-bit by 8-bit multiplier, which requires a significant number of logic gates and is not necessarily a fast operation. This operation can be converted into a bit shift if each CSTB size is a power of two. Exemplary sizes are shown in the table below for the case where N=64 and C=258. Now, to multiply by the given CSTB Size, S, we can just shift the Block Index to the left $\log_2(S)$ bits. This can be implemented for high-speed operation with minimal combinatorial logic to convert the Compression Type into the number of bits to shift, and then use that value to control a multiplexer to perform the shift. This may also require substantially less logic than the multiplier. For a slower implementation needing the least logic, a shift register can be used. The trade-off is that there is more unused memory. The more unused memory there is, the higher the probability the compiler will not be able to use it all. Nevertheless, this method can still achieve substantial compression ratios.

TABLE 6

Example for N = 64, C = 258. Table shows average unused words when CSTBs
of the same type are forced to be the same size which is a power of two.

| | | | | | Power of Two CSTB Sizing | | | |
| --- | --- | --- | --- | --- | --- | --- | --- | --- |
| Compression Type | Bits per Index (B) | UTIs per Word (I) | Words of Index (W) | Maximum Unique Transitions | CSTB Size (Words) | Worst Case Unused Words | Average Unused Words | Average Percent Increase |
| 0 | 1 | 64 | 5 | 2 | 8 | 2 | 1 | 13% |
| 1 | 2 | 32 | 9 | 4 | 16 | 4 | 2 | 13% |
| 2 | 3 | 21 | 13 | 8 | 32 | 14 | 7 | 22% |
| 3 | 4 | 16 | 17 | 16 | 64 | 38 | 19 | 30% |
| 4 | 5 | 12 | 22 | 32 | 64 | 25 | 12.5 | 20% |
| 5 | 6 | 10 | 26 | 64 | 128 | 69 | 34.5 | 27% |
| 6 | 7 | 9 | 29 | 128 | 256 | 162 | 81 | 32% |
| 7 | 8 | 8 | 33 | 160 | 256 | 94 | 47 | 18% |

Finally, in certain embodiments we can also take advantage of the simplification in computing the two effective addresses described earlier, in which the UTIs are constrained to be powers of two. This may have an equal effect on either of the above two implementations because it only impacts the total number of IB words, W, required for a given $C_{max}$. Whereas the unused memory above is due to the difference between the size of the UTB allocated versus that needed. This is shown in the table below for the example where N=64 and C=258. Note that the values in columns for Worst Case Unused Words and Average Unused Words are identical to those in Table 6. The second-to-last column of Table 7 shows the difference in size between these CSTBs and those for the optimal scheme of Table 6 and the last column show the percentage increase this is of the total size. Again, even though this is suboptimal, substantial compression ratios can be achieved while the cost of implementation is lower.

TABLE 7

Example for N = 64, C = 258. Table shows the extra words
required when the bits per UTI is required to be a power of two.

| Compression Type | Bits per Index (B) | Nearest Power of Two (B') | UTIs per Word (I') | Words of Index (W') | Max Unique Transitions | Words of CSTB | Worst Case Unused Words | Avg. Unused Words | Extra Words for Power of Two Indices | Extra Percent |
|---|---|---|---|---|---|---|---|---|---|---|
| 0 | 1 | 1 | 64 | 5 | 2 | 7 | 1 | 0.5 | 0 | 0% |
| 1 | 2 | 2 | 32 | 9 | 4 | 13 | 1 | 0.5 | 0 | 0% |
| 2 | 3 | 4 | 16 | 17 | 8 | 25 | 3 | 1.5 | 4 | 16% |
| 3 | 4 | 4 | 16 | 17 | 16 | 33 | 7 | 3.5 | 0 | 0% |
| 4 | 5 | 8 | 8 | 33 | 32 | 65 | 15 | 7.5 | 11 | 17% |
| 5 | 6 | 8 | 8 | 33 | 64 | 97 | 31 | 15.5 | 7 | 7% |
| 6 | 7 | 8 | 8 | 33 | 128 | 161 | 63 | 31.5 | 4 | 2% |
| 7 | 8 | 8 | 8 | 33 | 160 | 193 | 31 | 15.5 | 0 | 0% |

Although the quantity of each type of compression block needed by a given state machine varies considerably, analysis of the distribution used by various applications shows that the smaller blocks predominate, that is for Types 0 through 3. Depending on the embodiment, there can be more or less compression types (or sets of parameters) than the maximum number of array index bits (B). For example, one implementation may have B=16, which allows more than one set of compression parameters for the same value of B, with various CSTB sizes allowing for various numbers of UT's. In other embodiments, the quantity of compression types is less than or equal to B.

In one embodiment, larger compression blocks are used in the early transitions in the state machine to begin to distinguish among thousands to 10's of thousands of expressions. However, the further the transitions are from the start state, the fewer unique states are needed to determine which match is occurring. We would expect the number of unique transitions per state to decrease exponentially with distance from the start state, in general. The histogram for one such machine is offered as an example in the table below. The application profiled consists of a set of 3,721 regular expressions used to detect intrusion in a network.

TABLE 8

Histogram of the quantity of CSTBs needed versus
number of unique transitions for an intrusion
detection network security application.

| Number of Unique Transitions | Quantity |
|---|---|
| 1 | 1,998 |
| 2 | 6,999 |
| 3 | 15,796 |
| 4 | 17,982 |
| 5 | 11,075 |
| 6 | 14,002 |
| 7 | 16,489 |
| 8 | 15,729 |
| 9 | 14,862 |
| 10 | 18,764 |
| 11 | 17,511 |
| 12 | 11,781 |
| 13 | 7,035 |
| 14 | 3,491 |
| 15 | 1,920 |
| 16 | 1,589 |
| 17 | 1,393 |
| 18 | 627 |
| 19 | 134 |
| 20 | 30 |
| 21 | 10 |
| 22 | 11 |
| 23 | 58 |
| 24 | 3 |
| 25 | 2 |
| 27 | 3 |
| 33 | 1 |
| 34 | 1 |
| 41 | 1 |
| 42 | 1 |
| 46 | 1 |
| 48 | 1 |
| 52 | 1 |
| 54 | 1 |
| 61 | 1 |
| 71 | 1 |
| 84 | 1 |

For this example, using the optimal implementation for CSTBs, a net compression ratio of 12.6 was obtained versus 10.9, when restricting UTIs to be powers of two.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computerized method of compressing and processing information associated with a state machine, the method comprising:
   compressing and storing data associated with the state machine, by the steps of:
   identifying a state comprising a plurality of transition instructions, each transition instruction associated with at least one input character and a next state;
   determining respective next states indicated by each of the plurality of transition instructions;
   associating each unique next state with a selected one of a plurality of indices that are each indicative of respective unique next states, wherein one or more of the input characters are associated with a first of the plurality of indices;

storing the plurality of indices so that respective indices are associated with respective input characters;

storing each of the unique transition instructions so that each of the unique transition instructions are individually addressable in the memory and are accessible at respective locations indicated by the indices; and traversing the state machine, by the steps of:

determining a next character of an input data stream;

assessing a first memory associated with a current state of the state machine to determine the transition index associated with the next character;

accessing a second memory to determine the unique transition instruction associated with the determined transition index, wherein the unique transition instruction is indicative of a next state and each respective unique transition instruction uniquely identifies a next state for the current state; and selecting a next state indicated in the determined unique transition instruction.

2. The computerized method of claim 1, wherein at least some transition instructions are associated with multiple input characters.

3. The computerized method of claim 1, further comprising:

repeating the identifying, determining, associating, and storing for each of a plurality of states of the state machine.

4. The computerized method of claim 1, wherein the first and second memory are blocks of a single memory chip.

5. The computerized method of claim 1, wherein the next character is a member of a character class associated with one or more characters.

6. The computerized method of claim 1, wherein the next character is a single character.

7. The computerized method of claim 1, wherein a plurality of transition indices are stored at one memory address.

8. The computerized method of claim 1, wherein each transition index comprises B bits, wherein B is a ceiling function applied to a base-2 logarithm of a number of unique transition instructions.

9. The computerized method of claim 8, wherein each transition index comprises B' bits, wherein B' is a least power of two greater than or equal to B, wherein B is the ceiling function applied to the base-2 logarithm of the number of unique transition instructions.

10. A computerized system for compressing and storing information associated with a state of a state machine, the system comprising:

a compression module configured to analyze each of a plurality of transition instructions associated with a state to determine one or more unique transition instructions, wherein each transition instruction is associated with a respective character and a respective next state, and wherein each unique transition instruction is indicative of a different next state, thereby compressing the information associated with each state;

a memory configured to store the one or more unique transition instructions and respective instruction indices for each of the plurality of transition instructions in a compressed state transition block, wherein each instruction index is indicative of one of the unique transition instructions; and a state machine engine configured to access the compressed state transition block, the state machine engine comprising:

a receiving module configured to access an input data stream to be analyzed; and an access module configured to access a memory a first time to determine a transition index associated with a next character of the data stream and to access the memory a second time to determine a transition instruction associated with the next character, wherein an address of the transition instruction is indicated by the determined transition index and the unique transition instruction is indicative of a next state.

11. The computerized system of claim 10, wherein the instruction indices indicate memory addresses of their respectively associated unique transition instructions.

12. The computerized system of claim 10, wherein the instruction indices indicate memory offsets that, when added to a base memory address, indicate the addresses of their respectively associated unique transition instructions.

13. The computerized system of claim 10, wherein a plurality of instruction indices are stored in a single index word in the memory.

14. The computerized system of claim 13, wherein the single index word comprises a base address and an index depth.

15. The computerized system of claim 13, wherein a respective bit address of a particular instruction index of the single index word is calculated as a sum of a base address and a floor function of a character class identifier associated with the particular character divided by the quantity of transition indices per index word.

16. The computerized system of claim 10, wherein the memory stores a plurality of compressed state transition blocks each associated with respective states of the state machine, wherein each of the compressed state transition blocks comprises at least one index word comprising at least one transition index and at least one transition instruction word comprising a transition instruction.

17. The computerized system of claim 16, wherein at least one of the transition instructions comprises a character class type field, an array index field, and a hash field, wherein the hash field comprises values that are calculated by performing a logical XOR operation on respective least significant bits of the array index field with respective bits of the character class type field so that a most significant bit of the character class type field is XORed with a least significant bit of the array index and a least significant bit of the character class type field is XORed with a more significant bit of the array index.

18. The computerized system of claim 17, wherein the computerized system is configured to reconstruct respective array indices by performing one or more hash calculations using an associated character class type value.

19. The computerized system of claim 16, wherein the plurality of compressed state transition blocks each comprises a same quantity of memory words.

20. The computerized system of claim 16, wherein a first memory array is configured to store compressed state transition blocks of a first size and a second memory array is configured to store compressed state transition blocks of a second size, wherein the first and second sizes are not equal.

21. The computerized system of claim 16, further comprising:

an array module configured to determine one or more arrays in the memory for storing the compressed state transition blocks, wherein each of the one or more arrays is configured to store state transition blocks of different sizes and the array module selects the block sizes of each array based on one or more characteristics of the compressed state transition blocks to be stored.

22. The computerized system of claim 21, wherein a first array is configured to store state transition blocks of a first compression type and a second array is configured to store state transition blocks of a second compression type.

23. The computerized system of claim 21, further comprising an array data structure comprising, for each compression type associated with at least one of the compressed state transition blocks to be stored, a block size field, a base address field, a compression type field, and an offset field.

24. The computerized system of claim 10, wherein the input data stream is received from a network server.

25. The computerized system of claim 10, wherein the compressed state transition block comprises transition instructions associated with a state machine configured to detect viruses in the input data stream.

26. The computerized system of claim 10, wherein the compressed state transition block comprises transition instructions associated with a state machine configured to detect patterns indicative of network intrusions.

27. The computerized system of claim 10, wherein the state machine engine comprises one or more of an application specific integrated circuit, a field programmable gate array, and a network interface card.

28. The computerized system of claim 10, further comprising a network interface card configured to couple with a server, wherein the network interface card comprises the receiving module and the access module.

* * * * *